(12) United States Patent
Hirata (10) Patent No.: US 11,840,206 B2
(45) Date of Patent: Dec. 12, 2023

(54) BRAKE DEVICE (71) Applicant: ADVICS CO., LTD., Kariya (JP)

(72) Inventor: Haruki Hirata, Chiryu (JP)

(73) Assignee: ADVICS CO., LTD., Kariya (JP)

( * ) Notice: Subject to any disclaimer, the term of this patent is extended or adjusted under 35 U.S.C. 154(b) by 489 days.

(21) Appl. No.: 17/058,405

(22) PCT Filed: Jun. 11, 2019

(86) PCT No.: PCT/JP2019/023030
§ 371 (c)(1),
(2) Date: Nov. 24, 2020

(87) PCT Pub. No.: WO2019/240112
PCT Pub. Date: Dec. 19, 2019

(65) Prior Publication Data
US 2021/0197785 A1 Jul. 1, 2021

(30) Foreign Application Priority Data

Jun. 14, 2018 (JP) .................................. 2018-113853

(51) Int. Cl.
*B60T 8/34* (2006.01)
*B60T 17/04* (2006.01)
(Continued)

(52) U.S. Cl.
CPC ............ *B60T 17/04* (2013.01); *B60T 8/4068* (2013.01); *B60T 13/147* (2013.01); *B60T 15/028* (2013.01)

(58) Field of Classification Search
CPC .............................. B60T 8/4068; B60T 17/04
(Continued)

(56) References Cited

U.S. PATENT DOCUMENTS 4,769,990 A * 9/1988 Bach ....................... F15B 1/265
60/416
5,531,513 A * 7/1996 Tackett ................. B60T 8/4068
303/84.2

(Continued)

FOREIGN PATENT DOCUMENTS

| JP | 2004090842 A | | 3/2004 | |
|----|--------------|----|--------|------------|
| JP | 2013147176 A | * | 8/2013 | ............ B60T 8/4068 |
| JP | 2014040215 A | * | 3/2014 | ............ B60T 8/4068 |

OTHER PUBLICATIONS

Machine translation of JP 2014040215, dated May 2, 2023 (Year: 2023).*

(Continued)

*Primary Examiner* — Bradley T King
(74) *Attorney, Agent, or Firm* — BUCHANAN INGERSOLL & ROONEY PC (57) ABSTRACT

A housing of brake device includes a first oil path, a second oil path that is adjacent to the first oil path in a first direction along an axial direction of the first oil path and has a larger cross-section orthogonal to the axial direction than the first oil path, a third oil path connected to the first oil path, and a fourth oil path connected to the second oil path. A throttle member of the brake device is anchored to the housing by being press-fitted into the first oil path. The third oil path connects the fourth oil path through the throttle. When the throttle member moves in the first direction by releasing the press-fitting, the third oil path connects the fourth oil path through a gap between an inner circumferential surface forming the second oil path and an outer circumferential surface of the throttle member.

6 Claims, 8 Drawing Sheets

(51) Int. Cl.
*B60T 8/40* (2006.01)
*B60T 13/14* (2006.01)
*B60T 15/02* (2006.01)

(58) Field of Classification Search
USPC .......................................................... 303/87
See application file for complete search history.

(56) References Cited

U.S. PATENT DOCUMENTS

| | | | | |
|---|---|---|---|---|
| 5,921,636 | A * | 7/1999 | Roberts | B60T 8/4291 138/30 |
| 6,203,117 | B1 * | 3/2001 | Starr | B60T 8/4068 303/DIG. 11 |
| 9,096,200 | B2 * | 8/2015 | Zeoli | B60T 8/4872 |
| 2004/0217559 | A1 * | 11/2004 | Schlitzkus | B60T 8/4068 280/1 |
| 2012/0133201 | A1 * | 5/2012 | Zeoli | B60T 8/4068 303/11 |
| 2013/0062933 | A1 * | 3/2013 | Daher | B60T 8/4068 303/113.1 |
| 2014/0292066 | A1 * | 10/2014 | Iyatani | B60T 8/4068 303/11 |
| 2017/0057478 | A1 * | 3/2017 | Her | B60T 8/4068 |
| 2017/0066423 | A1 * | 3/2017 | Her | B60T 8/4068 |
| 2017/0096131 | A1 * | 4/2017 | Song | B60T 8/4068 |
| 2018/0304873 | A1 * | 10/2018 | Haeusser | F04B 1/0404 |
| 2019/0283724 | A1 * | 9/2019 | Song | B60T 8/344 |

OTHER PUBLICATIONS

International Search Report (PCT/ISA/210) dated Sep. 10, 2019, by the Japan Patent Office as the International Searching Authority for International Application No. PCT/JP2019/023030.

Written Opinion (PCT/ISA/237) dated Sep. 10, 2019, by the Japan Patent Office as the International Searching Authority for International Application No. PCT/JP2019/023030.

* cited by examiner

BRAKE DEVICE

TECHNICAL FIELD

The present disclosure relates to a brake device.

BACKGROUND ART

A brake device has had a housing provided with an oil path, a throttle member provided with a throttle and press-fitted to the oil path. the When the throttle of the throttle member is clogged with foreign substances, the throttle member moves to the downstream side by the increase in the fluid pressure on the upstream side. Then, a close state of the housing and a part of the throttle member that are in close contact with each other is released. As a result, a minute oil path is formed between the housing and the throttle member (Patent Literature 1: Japanese Unexamined Patent Application Publication No. 2004-90842).

SUMMARY OF INVENTION

Technical Problems

The throttle member is difficult to move since the diameter of the moving section of the throttle member in the oil path of the housing is constant. Therefore, the pressure on the upstream side of the throttle member may be too high.

One of the objects of the present invention is to obtain a brake device that can prevent the pressure on the upstream side of the throttle member from becoming too high.

Solutions to Problems

A brake device of the present disclosure includes a housing formed with a first oil path, a second oil path that is adjacent to the first oil path in a first direction along an axial direction of the first oil path and has a larger cross-section orthogonal to the axial direction than the first oil path, a third oil path connected to the first oil path, and a fourth oil path connected to the second oil path; and a throttle member that is anchored to the housing by being press-fitted into the first oil path and that is provided with a throttle that passes through in the axial direction; where the third oil path and the fourth oil path are connected through the throttle; and when the press-fitting of the throttle member into the first oil path is released and the throttle member is moved in the first direction, the third oil path and the fourth oil path are connected through a gap between an inner circumferential surface forming the second oil path of the housing and an outer circumferential surface of the throttle member.

In the configuration described above, when the press-fitting of the throttle member to the first oil path is released and the throttle member is moved in the first direction, the third oil path and the fourth oil path are connected through the gap between the inner circumferential surface forming the second oil path of the housing and the outer circumferential surface of the throttle member. Furthermore, the second oil path has a larger cross-section orthogonal to the axial direction than the first oil path. Therefore, the throttle member can be easily moved in the first direction as compared with a case where the cross-section of the moving section of the throttle member in the oil path of the housing is constant. Therefore, according to the above configuration, the pressure on the upstream side of the throttle member can be suppressed from becoming too high.

DESCRIPTION OF EMBODIMENTS

An exemplary embodiment of the present disclosure will be disclosed below. The configurations of the embodiment shown below, and the operations, results and effects provided by the configurations are merely examples. The present disclosure can also be realized with configurations other than the configurations disclosed in the following embodiment. Furthermore, according to the present disclosure, it is possible to obtain at least one of the various effects obtained by the configuration.

Moreover, similar components are included in a plurality of embodiments below. Common reference numerals are given to those similar components, and redundant description will be omitted. In the present specification, the ordinal numbers are used to distinguish components, parts, and the like, and do not indicate order or priority.

First Embodiment

Figure 1:
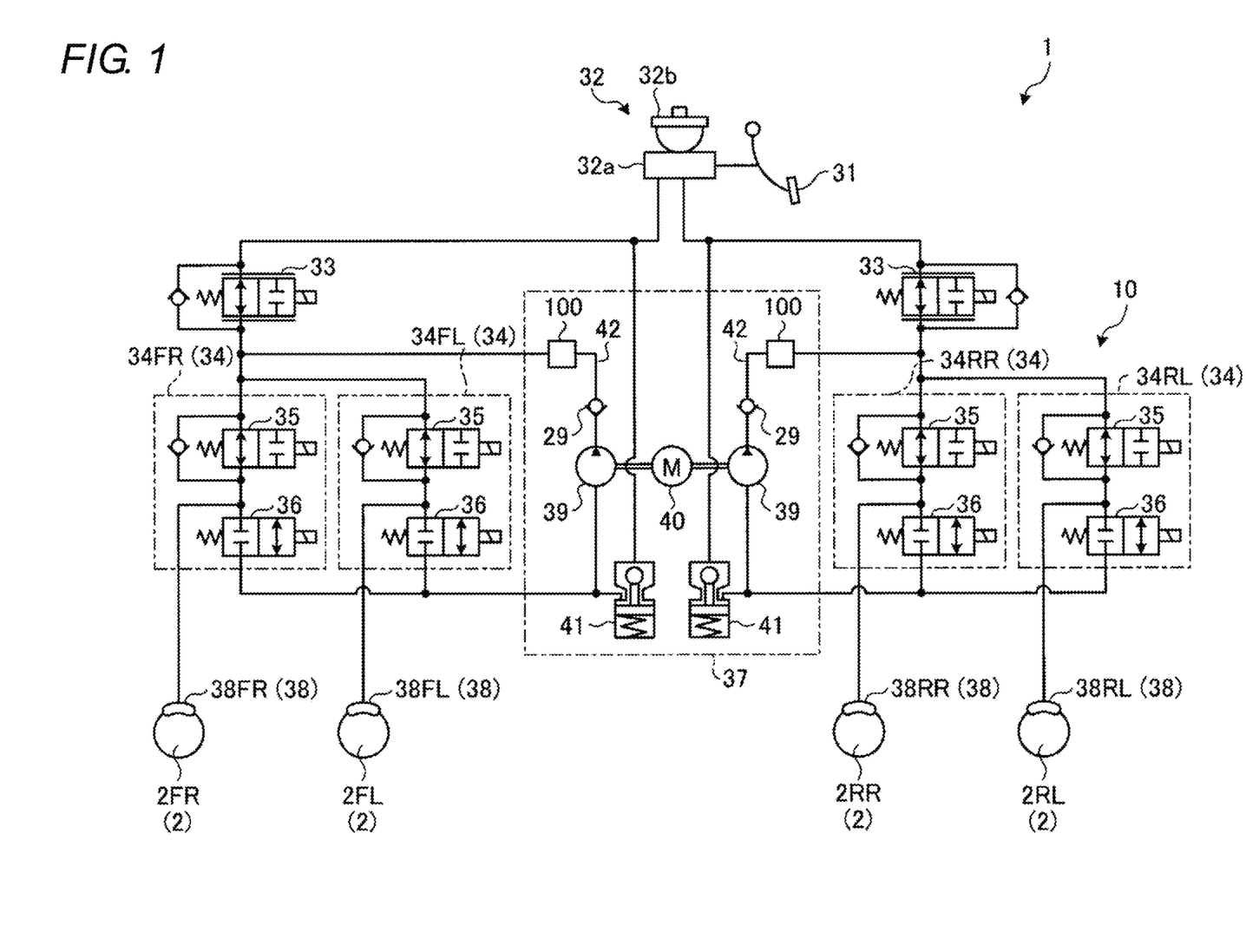
FIG. 1 is an exemplary and schematic configuration diagram of a brake device according to a first embodiment.

FIG. 1 is an exemplary and schematic configuration diagram of a brake device 1. The brake device 1 is provided, for example, in a four-wheel vehicle. The technique of the embodiment can be applied to vehicles other than the four-wheel vehicle.

As shown in FIG. 1, the brake device 1 includes a hydraulic circuit 10. The brake device 1 is configured to be able to apply a braking force (friction braking torque) to each of the wheels 2FL and 2FR, which are front wheels, and the wheels 2RL and 2RR, which are rear wheels, by the pressure (fluid pressure) of the brake fluid in the hydraulic circuit 10. The brake fluid may also be referred to as fluid.

The hydraulic circuit 10 includes a pressure generation unit 32, wheel cylinders 38FL, 38FR, 38RL, and 38RR, pressure adjustment units 34FL, 34FR, 34RL, and 34RR, and a reflux mechanism 37.

In the following, for simplification, the wheels 2FL, 2FR, 2RL, 2RR may be collectively referred to as the wheel 2, the wheel cylinders 38FL, 38FR, 38RL, 38RR may be collectively referred to as the wheel cylinder 38, and the pressure adjustment units 34FL, 34FR, 34RL, 34RR may be collectively referred to as the pressure adjustment unit 34.

The pressure generation unit 32 is a mechanism that generates a pressure (fluid pressure) according to the operation of a brake pedal 31 by a driver of the vehicle. Each of the wheel cylinders 38FL, 38FR, 38RL, and 38RR is a mechanism that applies a braking force to the wheels 2FL, 2FR, 2RL, and 2RR by pressurizing a friction braking member.

Furthermore, each of the pressure adjustment units 34FL, 34FR, 34RL, and 34RR is a mechanism that adjusts the fluid pressures applied to the wheel cylinders 38FL, 38FR, 38RL, and 38RR. The reflux mechanism 37 is a mechanism that refluxes the brake fluid serving as a medium for generating fluid pressure to the upstream side, that is, from the wheel cylinder 38 side to the pressure generation unit 32 side.

The pressure generation unit 32 includes a master cylinder 32a and a reservoir tank 32b. The master cylinder 32a discharges the brake fluid replenished from the reservoir tank 32b to the two discharge ports based on the pressure generated according to the operation (depressing operation) of the brake pedal 31 by the driver.

The two discharge ports of the master cylinder 32a are connected to the front side pressure adjustment unit 34 (34FR and 34FL) and the rear side pressure adjustment unit (34RR and 34RL) through an electromagnetic valve 33 that electrically switches between the open state and the closed state. The electromagnetic valve 33 opens and closes based on an electric signal provided from a control unit (not shown) or the like.

The pressure adjustment unit 34 includes electromagnetic valves 35 and 36 that electrically switch between the open state and the closed state. The electromagnetic valves 35, 36 are provided between the electromagnetic valve 33 and the reservoir 41 of the reflux mechanism 37. The electromagnetic valve 35 is provided on the electromagnetic valve 33 side, and the electromagnetic valve 36 is provided on the reservoir 41 side.

The wheel cylinder 38 is connected between the electromagnetic valves 35 and 36. Thus, the electromagnetic valves 35, 36 can be opened/closed based on an electric signal provided from the control unit or the like to increase, hold, or decrease the fluid pressure of the wheel cylinder 38.

More specifically, the electromagnetic valve 35 is a so-called NO (normally open) valve that is normally set to an open state. Therefore, the electromagnetic valve 35 in the off state (normal time) in which an electric signal is not received functions as a pressure increasing valve capable of increasing the fluid pressure of the wheel cylinder 38 by flowing the brake fluid into the wheel cylinder 38, and the electromagnetic valve 35 in the ON state (in activation) in which an electric signal is received functions as a holding valve capable of holding the fluid pressure of the wheel cylinder 38 by inhibiting the inflow of the brake fluid to the wheel cylinder 38.

On the other hand, the electromagnetic valve 36 is a so-called NC (normally closed) valve that is normally set to a closed state. Therefore, the electromagnetic valve 36 in the off state (normal time) in which an electric signal is not received functions as a holding valve capable of holding the fluid pressure of the wheel cylinder 38 by inhibiting the outflow of the brake fluid from the wheel cylinder 38, and the electromagnetic valve 36 in the ON state (in activation) in which an electric signal is received functions as a pressure decreasing valve capable of decreasing the fluid pressure of the wheel cylinder 38 by flowing out the brake fluid from the wheel cylinder 38.

The reflux mechanism 37 has a reservoir 41, a pump 39, a motor 40, and a damper 100. Note that, in the example of FIG. 1, the reservoir 41, the pump 39, and the damper 100 are provided, one each, with respect to the front side pressure adjustment unit 34 (34FR and 34FL) and the rear side pressure adjustment unit 34 (34RR and 34RL).

The reservoir 41 temporarily stores the brake fluid flowing out from the wheel cylinder 38.

The pump 39 is driven by the motor 40 to pump the brake fluid from the wheel cylinder 38 side to the master cylinder 32a side. The pump 39 is, for example, a positive displacement pump such as a gear pump. The pump 39 may be a pump of a type other than the gear pump. Furthermore, the pump 39 causes discharge pulsation. When the pump 39 is a gear pump, pulsation occurs as many times as the number of external teeth per rotation. The pump 39 is an example of a pressurization source.

Two pumps 39 are driven by one motor 40. In other words, one motor 40 is shared for driving the two pumps 39. The motor 40 drives the pump 39 under the control of the control unit.

Furthermore, a check valve 29 for preventing backflow to the pump 39 is provided in the discharge oil path 42 extending from the discharge side of each pump 39. The discharge oil path 42 connects the pump 39 and between the electromagnetic valve 33 and the electromagnetic valve 35. The discharge oil path 42 is an example of the oil path of the hydraulic circuit 10.

The damper 100 is provided on the downstream side of the check valve 29 in the discharge oil path 42.

Therefore, the brake fluid discharged from the pump 39 and passed through the check valve 29 flows into the damper 100. The damper 100 is configured to reduce the discharge pulsation of the pump 39. Details of the damper 100 will be described later.

The control unit is configured by, for example, an electronic control unit (ECU) having computer resources such as a processor and a memory. The control unit controls the hydraulic circuit 10 based on the detection result of a sensor (not shown) that detects various state quantities of the vehicle. Sensors that detect various state quantities of the vehicle include, for example, a sensor that detects the stroke amount of the brake pedal 31, a sensor that detects the pressure in the master cylinder 32a, a sensor that detects the rotation speed (rotation number) of the wheels 2, a sensor that detects the acceleration (deceleration) of the vehicle, or the like.

The control unit performs various brake controls such as antilock brake control. The antilock control is a control for suppressing the lock of the wheel 2 (difference between wheel speed and actual vehicle speed, slip) that may occur during, for example, sudden braking or braking on a road surface where the road surface resistance is relatively low. The antilock control reduces the difference between the wheel speed and the actual vehicle speed by, for example, operating the motor 40, controlling the electromagnetic valves 35, 36 to intermittently reflux the brake fluid from the wheel cylinder 38 side to the master cylinder 32a side, and decreasing, holding, and increasing the pressure of the wheel cylinder 38 while appropriately switching.

Figure 2:
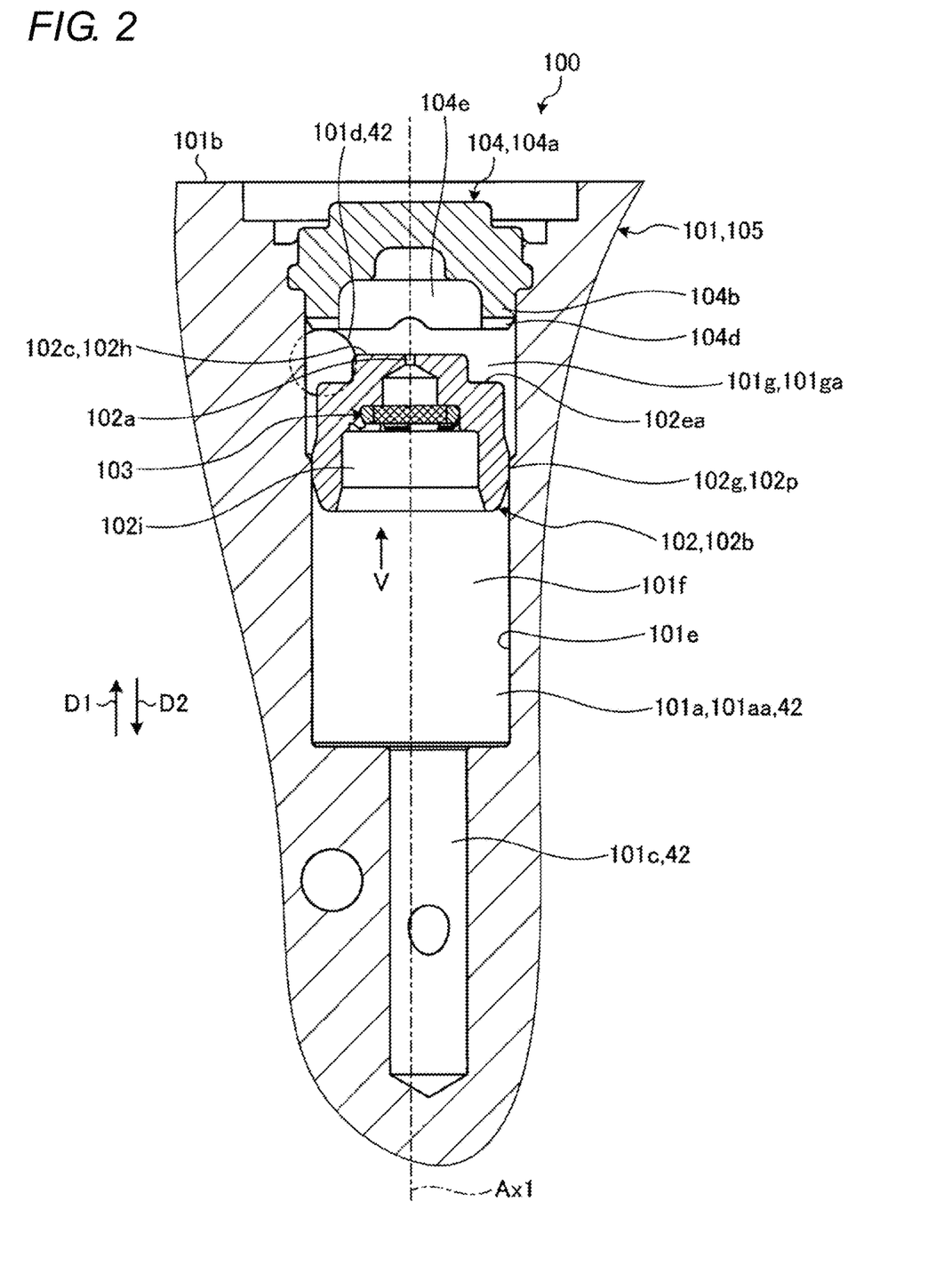
FIG. 2 is an exemplary and schematic cross-sectional view of a damper of the first embodiment.
Figure 3:
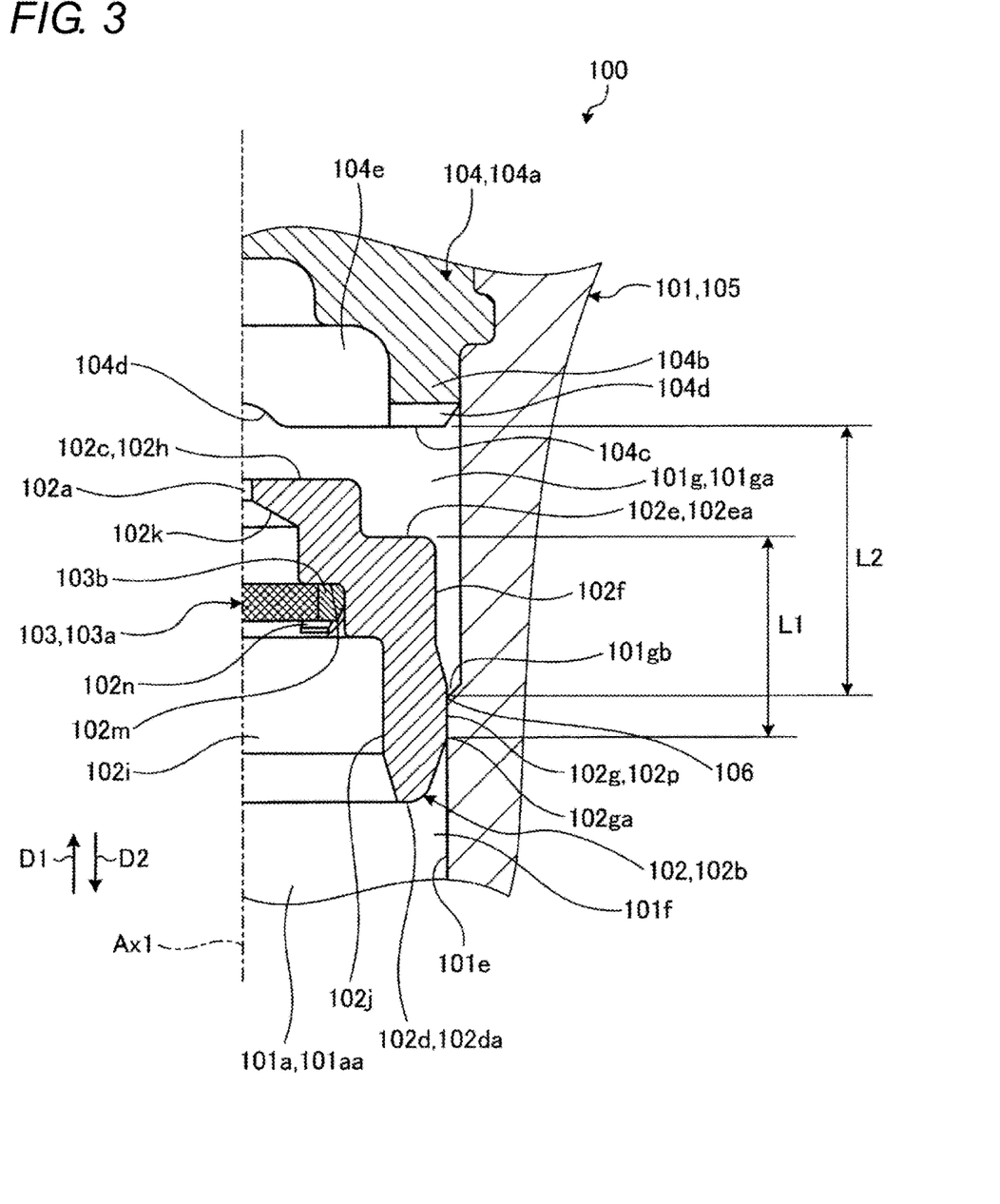
FIG. 3 is an exemplary and schematic enlarged view of a part of the damper of FIG. 2.
Figure 4:
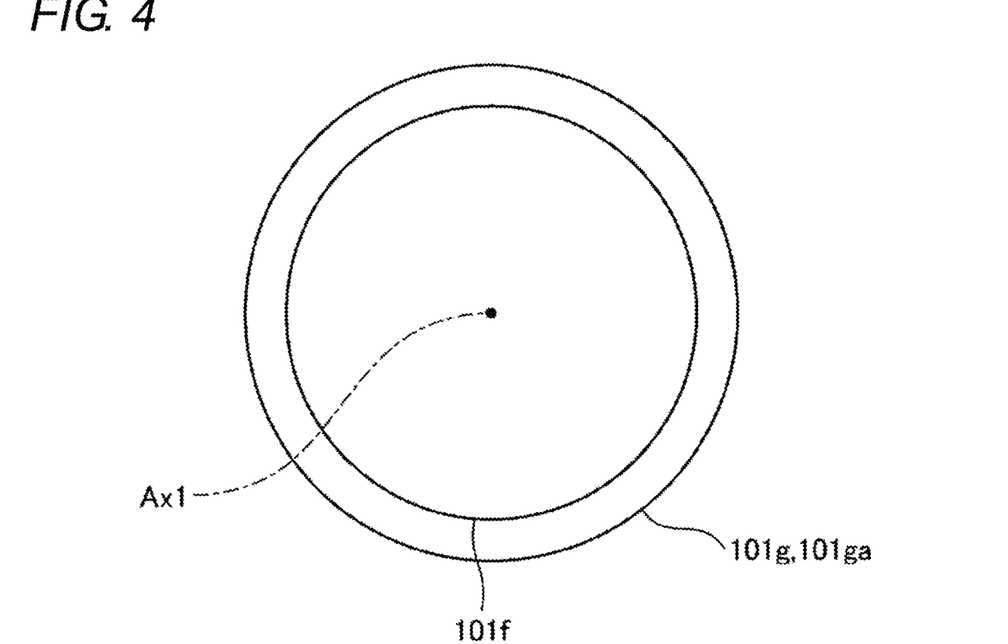
FIG. 4 is an explanatory diagram for explaining the size of the cross-section of a first oil path and the cross-section of a second oil path of the first embodiment.
Figure 5:
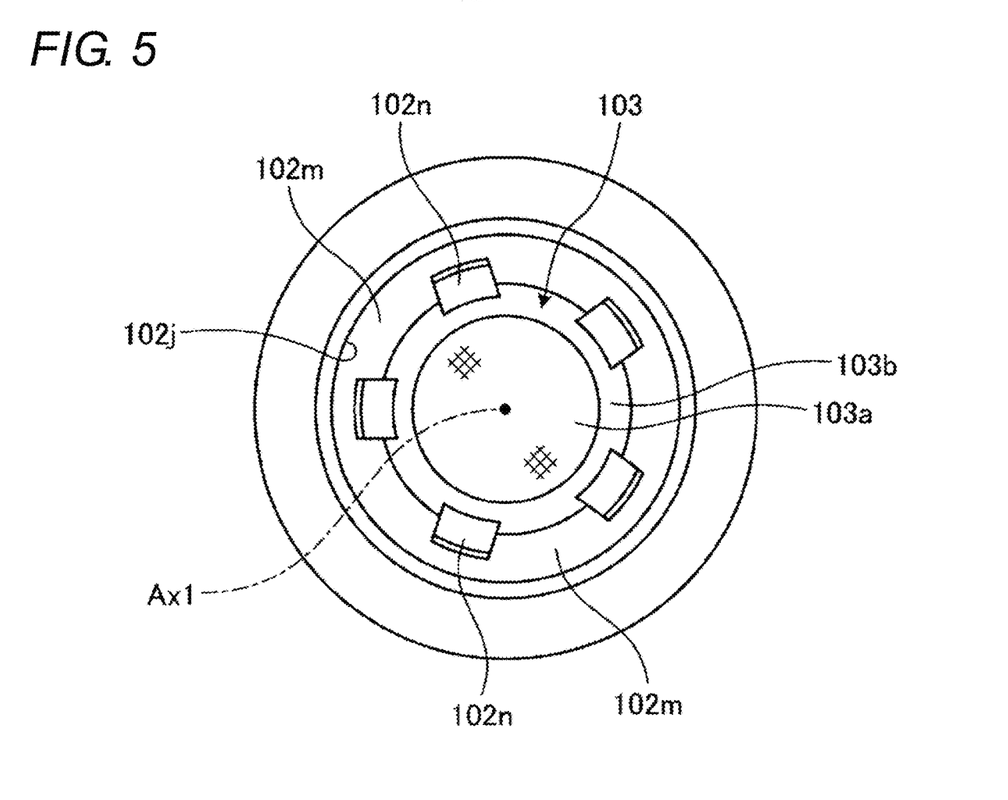
FIG. 5 is a view taken along arrow V in FIG. 2.
Figure 6:
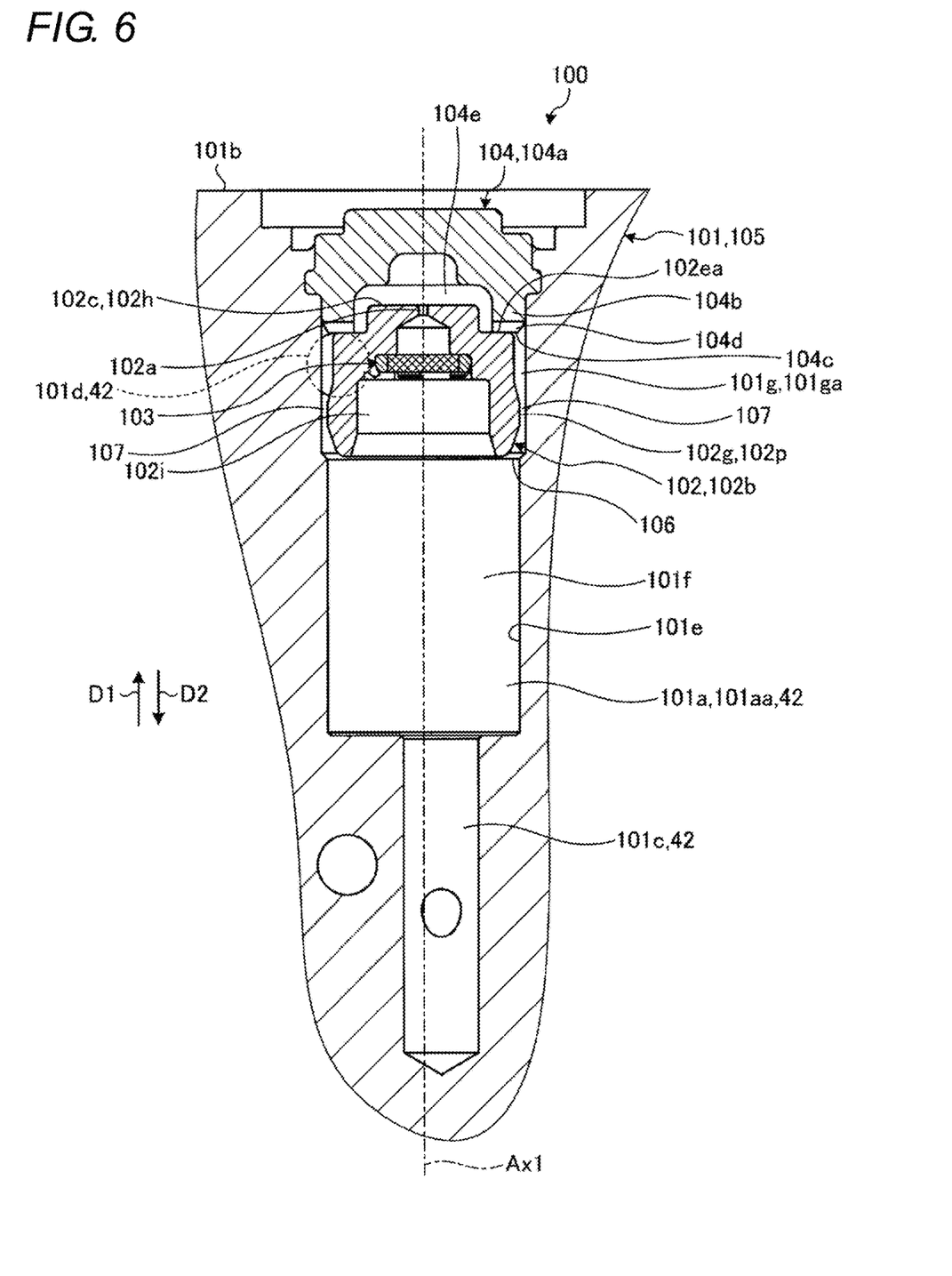
FIG. 6 is an exemplary and schematic cross-sectional view of the damper of the first embodiment, showing a state in which a throttle member has moved into the second oil path.
Figure 7:
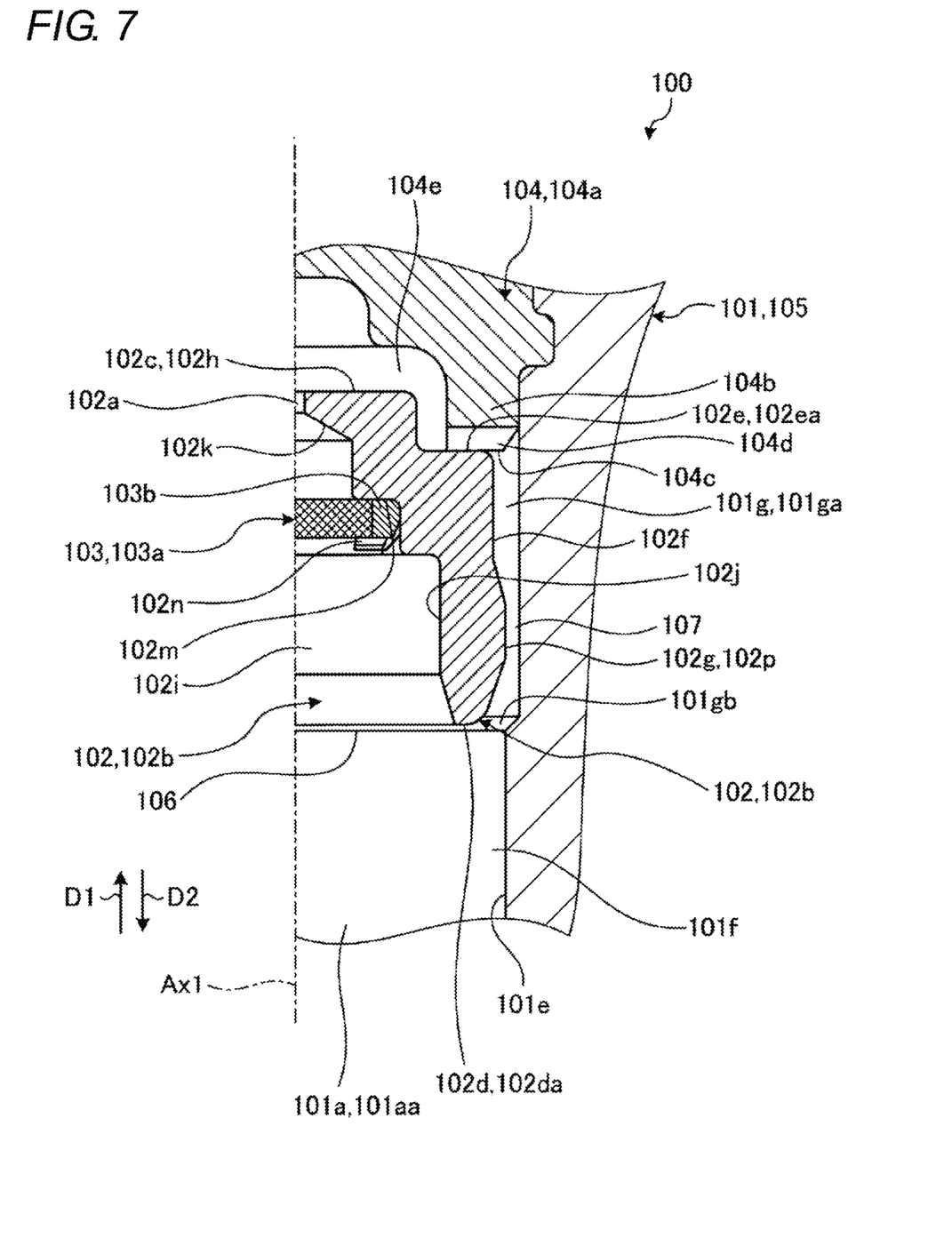
FIG. 7 is an exemplary and schematic enlarged view of a part of the damper of FIG. 6.

FIG. 2 is an exemplary and schematic cross-sectional view of the damper 100. FIG. 3 is an exemplary and schematic enlarged view of a part of the damper 100 of FIG. 2. FIG. 4 is an explanatory diagram for explaining the size of the cross-section of a first oil path 101f and the cross-section of a second oil path 101g. FIG. 5 is a view taken along arrow V in FIG. 2. FIG. 6 is an exemplary and schematic cross-sectional view of the damper 100, showing a state in which the throttle member 102 has moved into the second oil path 101g. FIG. 7 is an exemplary and schematic enlarged view of a part of the damper 100 of FIG. 6.

As shown in FIG. 2, the damper 100 includes a housing 101, a throttle member 102, a filter 103, and a seal member 104.

The housing 101 is made of, for example, a metal material such as an aluminum alloy or an iron-based material. The housing 101 is provided with a bottomed hole 101a forming the discharge oil path 42. The hole 101a is formed in a columnar shape with a step provided on the outer circumferential surface and centered on a central axis Ax1, and opens to the outer surface 101b of the housing 101. Hereinafter, unless otherwise specified, the axial direction of the central axis Ax1 may be simply referred to as the axial direction. Furthermore, in the present embodiment, the first direction D1 along the axial direction is defined. The first direction D1 is a direction from the bottom portion of the hole 101a toward the open end (outer surface 101b) of the hole 101a.

Furthermore, the housing 101 is provided with an upstream hole 101c forming the discharge oil path 42 on the upstream side of the hole 101a and a downstream hole 101d forming the discharge oil path 42 on the downstream side of the hole 101a. The upstream hole 101c is formed in a bottomed columnar shape having a smaller diameter than the hole 101a. The upstream hole 101c is opened at the bottom portion of the hole 101a and is connected to the hole 101a. The downstream hole 101d is opened at the outer circumferential surface of the hole 101a and is connected to the hole 101a. The downstream hole 101d extends in a direction intersecting, specifically, a direction orthogonal to the axial direction. The upstream hole 101c is an example of a third oil path, and the downstream hole 101d is an example of a fourth oil path.

Moreover, the housing 101 is provided with an inner circumferential surface 101e forming the hole 101a. That is, the inner circumferential surface 101e faces the hole 101a while surrounding the hole 101a. The inner circumferential surface 101e is formed in a stepped cylindrical shape centered on the central axis Ax1.

The hole 101a includes a first oil path 101f and a second oil path 101g. The first oil path 101f is formed in a columnar shape centered on the central axis Ax1. The diameter of the first oil path 101f is constant over the entire range of the first oil path 101f in the axial direction. Here, the axial direction of the central axis Ax1 is the axial direction of the first oil path 101f.

The second oil path 101g is provided adjacent to the first oil path 101f in the first direction D1 of the first oil path 101f. The second oil path 101g is formed in a columnar shape centered on the central axis Ax1. Specifically, as shown in FIG. 3, the second oil path 101g has a first portion 101ga and a second portion 101gb.

The first portion 101ga is located spaced apart from the first oil path 101f in the axial direction. The first portion 101ga is formed in a columnar shape centered on the central axis Ax1. The diameter of the first portion 101ga is constant over the entire range of the first portion 101ga in the axial direction. FIG. 4 shows a cross-section orthogonal to the axial direction of the first oil path 101f and a cross-section orthogonal to the axial direction of the first portion 101ga of the second oil path 101g. As shown in FIGS. 3 and 4, the diameter of the first portion 101ga is larger than the diameter of the first oil path 101f. The downstream holes 101d are opened in the first portion 101ga (FIG. 2).

As shown in FIG. 3, the second portion 101gb is provided between the first oil path 101f and the first portion 101ga, and connects the first oil path 101f and the first portion 101ga. The second portion 101gb is formed in a truncated cone shape centered on the central axis Ax1 so that the diameter thereof increases in the first direction D1. That is, the second portion 101gb is formed in a tapered shape in which the diameter becomes smaller in the second direction D2 which is the opposite direction to the first direction D1.

The cross-section of the second oil path 101g (first portion 101ga, second portion 101gb) having the above-described configuration orthogonal to the axial direction is larger than the cross-section of the first oil path 101f orthogonal to the axial direction.

Furthermore, as shown in FIG. 2, the housing 101 includes a configuring member 105 provided with a hole 101a (first oil path 101f, second oil path 101g), an upstream hole 101c, a downstream hole 101d, and an inner circumferential surface 101e. The housing 101 may further include other configuring members other than the configuring member 105. The configuring member 105 is an example of a first member.

As shown in FIGS. 2 and 3, the throttle member 102 is anchored to the housing 101 by being press-fitted into the first oil path 101f. Specifically, the throttle member 102 is placed in the second oil path 101g of the hole 101a from the open end of the hole 101a, and is pushed into the first oil path 101f in the second direction D2, thus being anchored to the first oil path 101f. The throttle member 102 is provided with a throttle 102a that passes through the throttle member 102, and the upstream hole 101c and the downstream hole 101d are connected through the throttle 102a. The throttle member 102 is made of, for example, a metal material such as an aluminum alloy or an iron-based material.

The throttle member 102 has a base portion 102b and a projecting portion 102c provided with the throttle 102a.

As shown in FIG. 3, the base portion 102b is formed in a cylindrical shape centered on the central axis Ax1. The base portion 102b has one end 102d in the second direction D2, the other end 102e in the first direction D1, and an outer circumferential surface 102f. The one end 102d includes one end face 102da facing the second direction D2, and the other end 102e includes another end face 102ea facing the first direction D1.

The outer circumferential surface 102f is formed in a cylindrical shape centered on the central axis Ax1 and extends over the one end face 102da and the other end face 102ea. The outer circumferential surface 102f is included in the outer circumferential surface 102p of the throttle member 102.

Furthermore, the base portion 102b has a press-fitting portion 102g. The press-fitting portion 102g is formed in a cylindrical shape centered on the central axis Ax1. The outer diameter of the press-fitting portion 102g is constant over the entire range of the press-fitting portion 102g in the axial direction. The press-fitting portion 102g has a larger outer diameter than the other portions of the throttle member 102. That is, the press-fitting portion 102g has the largest cross-section orthogonal to the axial direction of the throttle member 102. The press-fitting portion 102g is provided between the one end face 102da and the other end face 102ea while being spaced apart from the one end face 102da and the other end face 102ea. That is, the other end face 102ea is located in the first direction D1 than the press-fitting portion 102g. The press-fitting portion 102g is press-fitted into the first oil path 101f and is in contact with the inner circumferential surface 101e forming the first oil path 101f. Furthermore, the end on the downstream side of the press-fitting portion 102g is located in the second oil path 101g. The other end face 102ea is an example of a first contact portion. The press-fitting portion 102g may also be referred to as a maximum outer shape portion.

The projecting portion 102c projects out from the other end face 102ea of the base portion 102b in the first direction D1. The projecting portion 102c is formed in a cylindrical shape centered on the central axis Ax1. The outer diameter of the projecting portion 102c is smaller than the minimum outer diameter of the base portion 102b. The distal end face of the projecting portion 102c in the first direction D1 forms the other end face 102h of the throttle member 102 in the first direction D1.

Furthermore, the throttle member 102 is provided with a recess 102i recessed from the one end face 102da in the first direction D1. The recess 102i is formed so that its diameter gradually decreases in the first direction D1. The recess 102i is surrounded by the inner circumferential surface 102j of the throttle member 102. Furthermore, the inner circumferential surface 102j has a tapered surface 102k provided on the projecting portion 102c. The tapered surface 102k is formed so that its diameter becomes smaller in the first direction D1.

As shown in FIG. 3, the throttle 102a is provided on the projecting portion 102c. The throttle 102a passes through a portion of the throttle member 102 between the tapered surface 102k and the other end face 102h. That is, the throttle 102a is open to the tapered surface 102k and the other end face 102h. The throttle 102a is formed in a columnar shape centered on the central axis Ax1.

Furthermore, as shown in FIG. 2, a portion on the upstream side of the throttle member 102 of the first oil path 101f in the hole 101a forms a damper chamber 101aa.

As shown in FIG. 3, the filter 103 is arranged in the recess 102i of the throttle member 102. That is, the filter 103 is arranged on the upstream side of the throttle 102a.

As shown in FIGS. 3 and 5, the filter 103 includes a filtering member 103a and a supporting member 103b that supports the filtering member 103a. The filtering member 103a is formed in a disc shape and filters the brake fluid. The supporting member 103b is formed in a circular ring shape surrounding the outer circumferential surface of the filtering member 103a. The supporting member 103b is fixed to the throttle member 102 by being sandwiched between a mounting surface 102m provided on the inner circumferential surface 102j of the throttle member 102 and a plurality of claws 102n provided on the throttle member 102.

As shown in FIG. 2, the seal member 104 is arranged in the hole 101a of the housing 101 in the first direction D1 of the throttle member 102 and fitted in the hole 101a. That is, the seal member 104 is connected to the configuring member 105 of the housing 101. The seal member 104 faces the second oil path 101g, and the second oil path 101g is formed by the inner circumferential surface 101e. The seal member 104 is configured by a plug that is a metal such as, for example, an aluminum alloy or an iron-based material. The seal member 104 is an example of the second member.

As shown in FIG. 3, the seal member 104 has a base portion 104a that is anchored to the housing 101 and that has blocked the hole 101a, and a stopper 104b connected to the base portion 104a.

The stopper 104b projects out in the second direction D2 from the end of the base portion 104a in the second direction D2. The stopper 104b is formed in a cylindrical shape centered on the central axis Ax1. The inner diameter of the stopper 104b is larger than the outer diameter of the projecting portion 102c of the throttle member 102. The stopper 104b has an end face 104c in the second direction D2. The end face 104c is spaced apart in the first direction D1 from the other end face 102ea of the throttle member 102 in a state where the press-fitting portion 102g is press-fitted into the first oil path 101f. That is, the end face 104c and the other end face 102ea face each other in the axial direction.

The end face 104c is provided with a plurality of groove portions 104d. The plurality of groove portions 104d are provided around the central axis Ax1 at intervals. Each of the plurality of groove portions 104d extends in the radial direction of the central axis Ax1. Each of the plurality of groove portions 104d is recessed from the end face 104c in the first direction D1, and is open to the inner circumferential surface and the outer circumferential surface of the stopper 104b. That is, the end face 104c is divided into a plurality of regions by the plurality of groove portions 104d. The end face 104c is an example of a second contact portion. The groove portion 104d can also be called an oil path or a communication path.

Furthermore, the seal member 104 is provided with a recess 104e. The recess 104e is recessed from the end face 104c in the first direction D1 and is surrounded by the inner circumferential surface of the stopper 104b.

Furthermore, as shown in FIG. 3, a first distance L1 along the axial direction between the end 102ga in the second direction D2 of the press-fitting portion 102g of the throttle member 102 and the other end face 102ea is shorter than a second distance L2 along the axial direction between a boundary 106 of the first oil path 101f and the second oil path 101g and the end face 104c of the stopper 104b.

As apparent from FIG. 2, in the damper 100 having the configuration described above, the brake fluid sent from the pump 39 to the upstream hole 101c passes the damper chamber 101aa, the throttle member 102, and between the throttle member 102 and the seal member 104 in this order, and flows out to the downstream hole 101d. In this way, as the brake fluid passes through the damper 100, the discharge pulsation of the pump 39 reduces. Furthermore, in the throttle member 102, the brake fluid passes through the throttle 102a after passing through the filter 103.

Foreign substances in the brake fluid are removed by the filter 103 while the brake fluid passes through the filter 103. The foreign substance that is small enough to pass through the filter 103 passes through the throttle 102a. The internal pressure increases because the filter 103 is blocked by foreign substances that do not pass through the filter 103. Specifically, the fluid pressure in the damper chamber 101aa and the portion on the upstream side of the filter 103 in the recess 102i of the throttle member 102 increases. When the increased fluid pressure exceeds the threshold value, the fluid pressure causes the throttle member 102 to move in the first direction D1, and the entire press-fitting portion 102g comes out of the first oil path 101f. That is, the press-fitting of the press-fitting portion 102g into the first oil path 101f is released. Thereafter, as shown in FIG. 6, the throttle member 102 further moves in the first direction D1, and the other end face 102ea of the throttle member 102 ultimately comes into contact with the end face 104c of the stopper 104b, so that the throttle member 102 stops. In this state, the projecting portion 102c of the throttle member 102 is located on the inner side of the stopper 104b, that is, in the recess 104e. At this time, the projecting portion 102c is spaced apart from the seal member 104. Furthermore, when the press-fitting of the throttle member 102 is released, the upstream hole 101c and the downstream hole 101d are connected through a gap 107 described below, so that the other end face 102ea of the throttle member 102 and the end face 104c of the stopper 104b come into contact with each other while suppressing the pressure at the upstream portion of the throttle member 102 from becoming too high, and the throttle member 102 can be positioned.

As shown in FIG. 7, as described above, when the press-fitting of the press-fitting portion 102g of the throttle member 102 into the first oil path 101f is released and the throttle member 102 is moved in the first direction D1, a gap 107 is formed between the inner circumferential surface 101e forming the second oil path 101g and the outer circumferential surface 102p of the throttle member 102. That is, the gap 107 is formed between the outer circumferential surface 102p of the throttle member 102 and the housing 101. The gap 107 is formed in the second oil path 101g so as to face the outer circumferential surface 102p of the throttle member 102. The gap 107 has a cylindrical shape centered on the central axis Ax1. The gap 107 is formed in a state where the other end face 102ea of the base portion 102b of the throttle member 102 and the end face 104c of the stopper 104b are in contact with each other. In this state, as can be seen from FIG. 6, the upstream hole 101c and the downstream hole 101d are connected through the gap 107. Therefore, the brake fluid sent from the pump 39 to the upstream hole 101c flows out from the damper chamber 101aa through the gap 107 to the downstream hole 101d. At this time, a part of the brake fluid flows out to the downstream hole 101d through the gap 107, the groove portion 104d having the stopper 104b, between the projecting portion 102c and the seal member 104, and another groove portion 104d. The gap 107 may also be referred to as an annular oil path.

The gap 107 functions as a throttle. For example, the gap 107 has a throttle function equivalent to that of the throttle 102a. That is, the pressure loss Δ2 of the gap 107 is the same as the pressure loss Δ1 of the throttle 102a. Here, the pressure loss Δ1 of the throttle 102a and the pressure loss Δ2 of the gap 107 can be obtained by a known calculation formula. The pressure loss Δ1 of the throttle 102a has a value corresponding to the diameter of the throttle 102a, and the pressure loss Δ2 of the gap 107 has a value corresponding to the outer diameter of the press-fitting portion 102g or the diameter of the first portion 101ga of the second oil path 101g (diameter of the inner circumferential surface 101e forming the first portion 101ga). Therefore, in order to make the pressure loss Δ1 of the throttle 102a and the pressure loss Δ2 of the gap 107 the same, for example, the diameter of the throttle 102a, the outer diameter of the press-fitting portion 102g, and the diameter of the first portion 101ga of the second oil path 101g are appropriately set.

As described above, the brake device 1 of the present embodiment includes, for example, the housing 101 and the throttle member 102. The housing 101 is formed with the first oil path 101f, the second oil path 101g that is adjacent to the first oil path 101f in the first direction D1 along the axial direction of the first oil path 101f and that has a larger cross-section orthogonal to the axial direction than the first oil path 101f, the upstream hole 101c (third oil path) connected to the first oil path 101f, and the downstream hole 101d (fourth oil path) connected to the second oil path 101g. The throttle member 102 is anchored to the housing 101 by being press-fitted into the second oil path 101g. The throttle member 102 is provided with a throttle 102a that passes through in the axial direction. The upstream hole 101c and the downstream hole 101d are connected to each other through the throttle 102a. When the press-fitting of the throttle member 102 into the first oil path 101f is released and the throttle member 102 is moved in the first direction D1, the upstream hole 101c and the downstream hole 101d are connected through the gap 107 between the inner circumferential surface 101e of the housing 101 and the outer circumferential surface 102p of the throttle member 102.

Therefore, according to the present embodiment, the throttle member 102 can be easily moved in the first direction D1 as compared with a case where the cross-section of the moving section of the throttle member in the hole of the housing is constant. Therefore, according to the present embodiment, the pressure on the upstream side of the throttle member 102, that is, the damper chamber 101aa can be suppressed from becoming too high.

Furthermore, in the present embodiment, the throttle member 102 includes the press-fitting portion 102g that is press-fitted into the first oil path 101f and is brought into contact with the first oil path 101f, and the other end face 102ea (first contact portion) located in the first direction D1 than the press-fitting portion 102g. The housing 101 is provided with the stopper 104b having an end face 104c (second contact portion) spaced apart in the first direction D1 from the throttle member 102 in a state where the press-fitting portion 102g is press-fitted into the first oil path 101f. The first distance L1 along the axial direction between the end 102ga of the press-fitting portion 102g in the second direction D2 and the other end face 102ea is shorter than the second distance L2 along the axial direction between the boundary 106 of the first oil path 101f and the second oil path 101g and the end face 104c. In a state where the press-fitting of the press-fitting portion 102g to the first oil path 101f is released, the throttle member 102 is moved in the first direction D1 and the other end face 102ea and the end face 104c are in contact with each other, the upstream hole 101c and the downstream hole 101d are connected through the gap 107. Therefore, according to the present embodiment, in a state where the other end face 102ea and the end face 104c are in contact with each other, the entire press-fitting portion 102g of the throttle member 102 is located in the second oil path 101g and the gap 107 is formed.

Furthermore, in the present embodiment, the throttle member 102 includes a base portion 102b having the other end face 102ea and a projecting portion 102c projecting out in the first direction D1 from the other end 102e of the base portion 102b in the first direction D1. The throttle 102a is provided on the projecting portion 102c. Therefore, according to the present embodiment, the axial length of the base portion 102b and the length of the second distance L2 can be easily reduced. Therefore, the axial length of the portion (damper chamber 101aa) in the second direction D2 than the throttle member 102 in the first oil path 101f can be easily made longer.

Furthermore, in the present embodiment, the downstream hole 101d is opened to the second oil path 101g located in the second direction D2 of the stopper 104b and extended in the direction intersecting the axial direction. The stopper 104b has a circular ring shape. Therefore, according to the present embodiment, the brake fluid that has passed through the gap 107 quickly flows to the downstream hole 101d.

Moreover, in the present embodiment, the brake device 1 includes a configuring member 105 (first member) provided with the first oil path 101f and the second oil path 101g, and a seal member 104 (second member) having a stopper 104b and coupled with the configuring member 105. Therefore, according to the present embodiment, since the first oil path 101*f* and the second oil path 101*g* and the stopper 104*b* are provided on separate members, the housing 101 can be easily processed.

Moreover, in the present embodiment, the gap 107 functions as a throttle. Therefore, according to the present embodiment, even if the filter 103 provided upstream of 102*a* in the throttle member 102 is blocked, that is, even if the inside of the throttle member 102 is blocked, the press-fitting of the throttle member 102 to the first oil path 101*f* is released, the throttle member 102 is moved in the first direction D1, and the gap 107 is formed between the inner circumferential surface 101*e* of the housing 101 and the outer circumferential surface 102*p* of the throttle member 102, so that the throttle function is continued.

Second Embodiment

Figure 8:
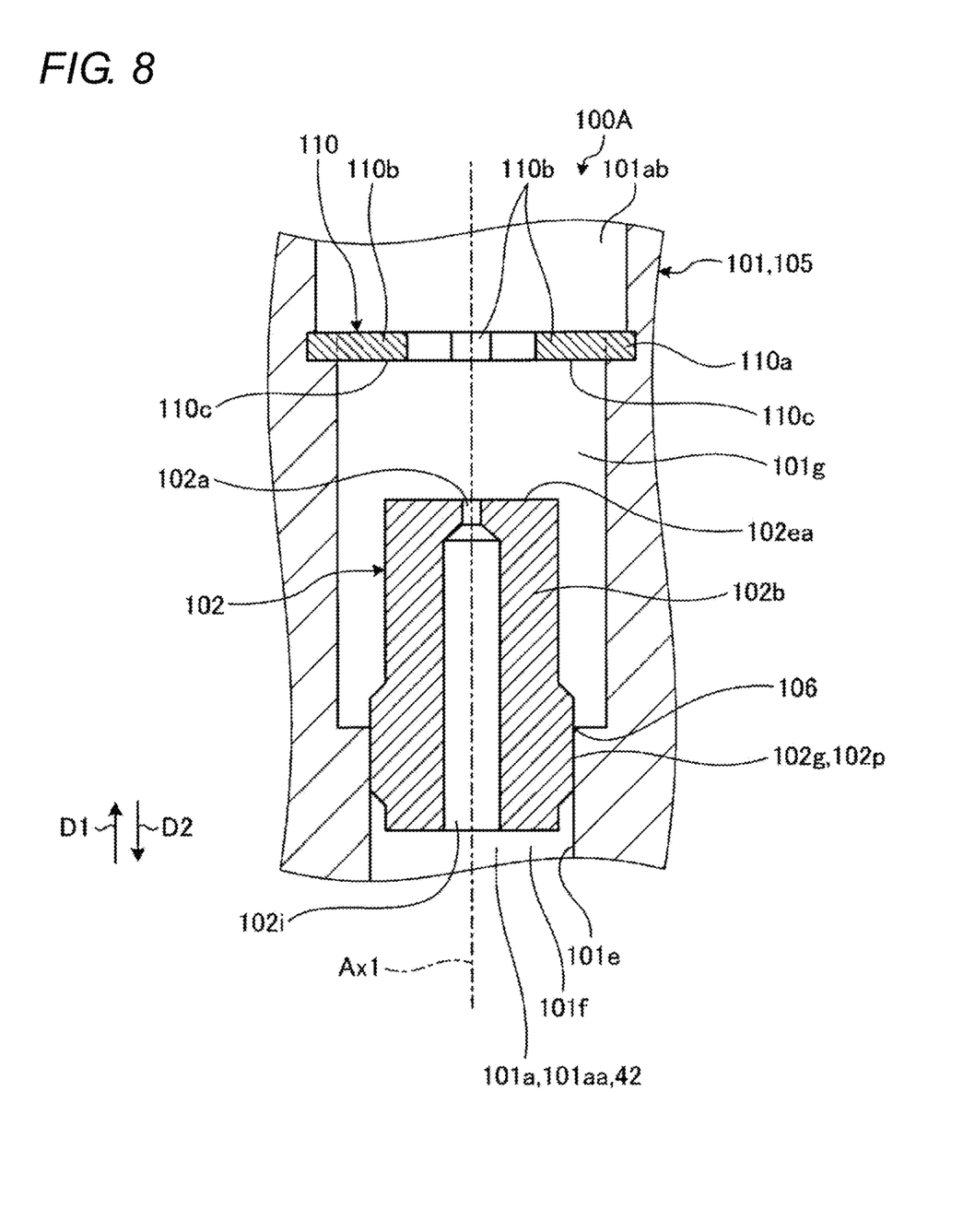
FIG. 8 is an exemplary and schematic cross-sectional view of a damper of a second embodiment.
Figure 9:
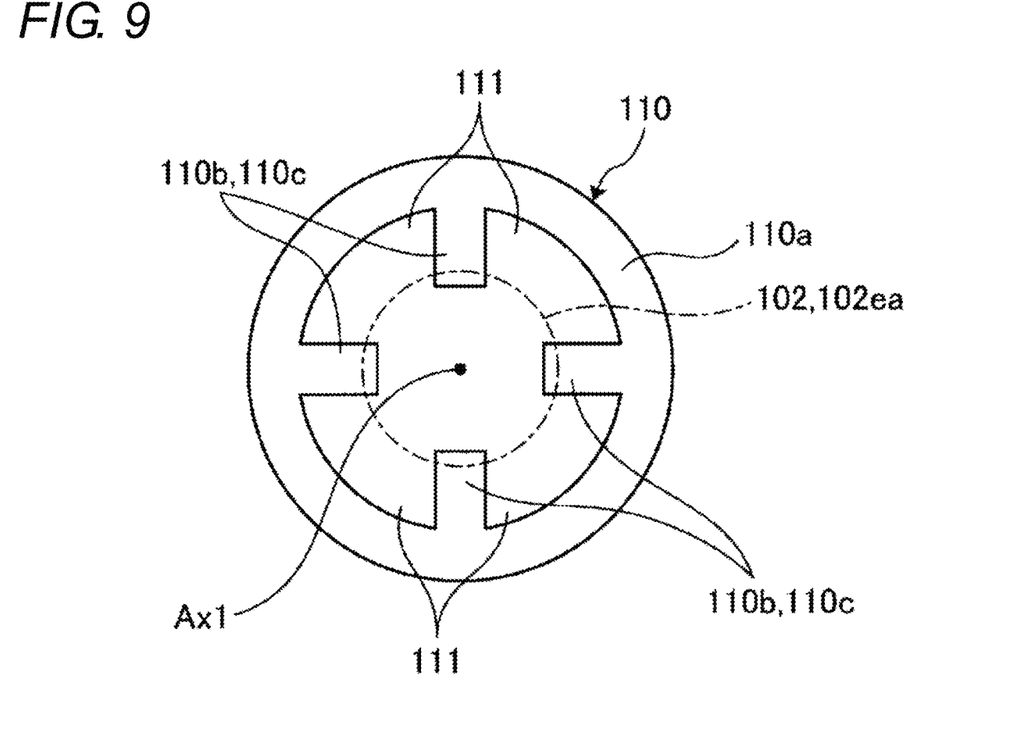
FIG. 9 is an exemplary and schematic plan view of an annular member of the second embodiment.

FIG. 8 is an exemplary and schematic cross-sectional view of a damper 100A. FIG. 9 is an exemplary and schematic plan view of an annular member 110.

As shown in FIG. 8, the damper 100A of the present embodiment has the same configuration as the damper 100 of the first embodiment. Therefore, according to the present embodiment, the same effect based on the same configuration as the first embodiment can be obtained. However, in the present embodiment, an annular member 110 is provided in place of the seal member 104 of the first embodiment. Furthermore, in this embodiment, the filter 103 of the first embodiment is not provided. Note that the filter 103 may be provided in the present embodiment as in the first embodiment.

The annular member 110 is arranged in the hole 101*a* of the housing 101 in the first direction D1 of the throttle member 102. The annular member 110 is fitted in the hole 101*a*. That is, the annular member 110 is coupled to the configuring member 105 of the housing 101. The annular member 110 is an example of the second member.

As shown in FIGS. 8 and 9, the annular member 110 has a circular ring shaped base portion 110*a* fixed to the housing 101 and a plurality of stoppers 110*b* connected to the base portion 110*a*. Although FIG. 9 shows an example in which four stoppers 110*b* are provided, the number of stoppers 110*b* may be other than four.

As shown in FIG. 9, the plurality of stoppers 110*b* project out from the inner circumferential surface of the base portion 110*a* toward the central axis Ax1. The plurality of stoppers 110*b* are arranged around the central axis Ax1 at intervals. A communication path 111 facing the stopper 110*b* is formed between the two stoppers 110*b* adjacent to each other around the central axis Ax1. The communication path 111 may also be referred to as an oil path.

As shown in FIG. 8, the stopper 110*b* has an end face 110*c* in the second direction D2. The end face 110*c* is spaced apart in the first direction D1 from the throttle member 102 in a state where the press-fitting portion 102*g* is press-fitted in the first oil path 101*f*. The end face 110*c* is an example of the second contact portion.

Furthermore, as shown in FIG. 8, in the present embodiment, the downstream portion 101*ab* of the hole 101*a* located on the opposite side of the throttle member 102 with respect to the annular member 110 is an oil path. That is, the downstream portion 101*ab* is located in the first direction D1 than the stopper 110*b*. The downstream portion 101*ab* is an example of a fourth oil path. Furthermore, in the present embodiment, the throttle member 102 is not provided with the projecting portion 102*c*. Note that the projecting portion 102*c* may be provided in the present embodiment as well.

In the damper 100A having the above configuration, when the throttle 102*a* is blocked by the foreign substance in the brake fluid, the internal pressure increases as in the first embodiment. Specifically, the fluid pressure in the damper chamber 101*aa* and the recess 102*i* of the throttle member 102 increases. When the increased fluid pressure exceeds the threshold value, the fluid pressure causes the throttle member 102 to move in the first direction D1, and the entire press-fitting portion 102*g* comes out of the first oil path 101*f* (not shown). That is, the press-fitting of the press-fitting portion 102*g* into the first oil path 101*f* is released. Thereafter, the throttle member 102 further moves in the first direction D1, and the other end face 102*ea* of the throttle member 102 ultimately comes into contact with the end face 110*c* of the stopper 110*b*, so that the throttle member 102 stops (not shown). Thus, in a state where the other end face 102*ea* of the throttle member 102 and the end face 110*c* of the stopper 110*b* are in contact with each other, the upstream hole 101*c* (FIG. 2) and the downstream portion 101*ab* are connected through the gap 107 (FIG. 7) and the communication path 111 between the plurality of stoppers 110*b*. Therefore, the brake fluid sent from the pump 39 to the upstream hole 101*c* flows out from the damper chamber 101*aa* through the gap 107 and the communication path 111 to the downstream portion 101*ab*.

As described above, according to the present embodiment, the brake fluid that has passed through the gap 107 can flow in the first direction D1 through the communication path 111 between the plurality of stoppers 110*b*. Therefore, the fourth oil path (downstream portion 101*ab*) can be provided in the first direction D1 of the stopper 110*b*, so that the degree of freedom in the layout of the oil path is improved.

In addition, in the second embodiment, an example in which the plurality of stoppers 110*b* are provided is shown, but the present disclosure is not limited to thereto. For example, the number of stoppers may be one. In this case, for example, the stopper may be formed in an annular shape similar to the stopper 104*b* of the first embodiment and may be formed with a groove portion similar to the groove portion 104*d*. In such a configuration, in a state where the press-fitting of the press-fitting portion 102*g* into the first oil path 101*f* is released, the throttle member 102 is moved in the first direction D1, and the other end face 102*ea* of the throttle member 102 and the end face of the stopper are in contact with each other, the upstream hole 101*c* and the downstream portion 101*ab* are connected through the gap 107 and the groove portion of the stopper. That is, in the configuration, the groove portion of the stopper is an example of the communication path. The groove portion may be formed on the other end face 102*ea* (first contact portion) of the throttle member 102, or may be formed on both the other end face 102*ea* of the throttle member 102 and the end face (second contact portion) of the stopper. Furthermore, the communication path may be a hole passing through the stopper or the throttle member 102. That is, the communication path may face both the stopper and the throttle member or one of the stopper and the throttle member. With the configuration described above as well, the operation and effects same as those of the second embodiment can be obtained.

The embodiments of the present disclosure have been exemplified above, but the embodiments described above are merely examples and are not intended to limit the scope of the disclosure. The above-described novel embodiment can be implemented in various forms, and various omissions, replacements, or modifications can be made without departing from the gist of the disclosure. Furthermore, the above-described embodiments and the modifications thereof are included in the scope and gist of the disclosure, and are included in the disclosure described in the claims and the equivalent scope thereof. For example, the cross-sectional shape of the first oil path, the second oil path, the throttle member, and the throttle may be polygonal or the like.

The invention claimed is:

1. A brake device comprising:
a housing formed with a first oil path, a second oil path that is adjacent to the first oil path in a first direction along an axial direction of the first oil path and that has a larger cross-section orthogonal to the axial direction than the first oil path, a third oil path connected to the first oil path, and a fourth oil path connected to the second oil path; and
a throttle member that is anchored to the housing by being press-fitted into the first oil path and that is provided with a throttle that passes through in the axial direction; wherein
the third oil path and the fourth oil path are connected through the throttle;
when the press-fitting of the throttle member into the first oil path is released and the throttle member is moved in the first direction, the third oil path and the fourth oil path are connected through a gap between an inner circumferential surface forming the second oil path of the housing and an outer circumferential surface of the throttle member;
the throttle member has a press-fitting portion that has the largest cross-section orthogonal to the axial direction of the throttle member and is press-fitted into the first oil path, and a first contact portion that is located further in the first direction than the press-fitting portion;
the housing is provided with a stopper having a second contact portion spaced apart in the first direction from the throttle member in a state where the press-fitting portion is press-fitted into the first oil path;
a first distance along the axial direction between an end of the press-fitting portion in a direction opposite to the first direction and the first contact portion is shorter than a second distance along the axial direction between a boundary of the first oil path and the second oil path and the second contact portion; and
in a state where the press-fitting of the press-fitting portion into the first oil path is released, the throttle member is moved in the first direction, and the first contact portion and the second contact portion are in contact with each other, the third oil path and the fourth oil path are connected through the gap.

2. The brake device according to claim 1, wherein
the throttle member includes a base portion having the first contact portion, and a projecting portion projecting out in the first direction from the end of the base portion in the first direction; and
the throttle is provided on the projecting portion.

3. The brake device according to claim 1, wherein
the stopper is located further in the first direction than an intersection of the fourth oil path with the second oil path, the fourth oil path extending in a direction intersecting the axial direction; and
the stopper has an annular shape.

4. The brake device according to claim 1, wherein
the fourth oil path is located further in the first direction than the stopper; and
in a state where the press-fitting of the press-fitting portion into the first oil path is released, the throttle member is moved in the first direction, and the first contact portion and the second contact portion are in contact with each other, the third oil path and the fourth oil path connected through a communication path facing both the stopper and the throttle member or one of the stopper and the throttle member.

5. The brake device according to claim 2, wherein
the stopper is located further in the first direction than an intersection of the fourth oil path with the second oil path, the fourth oil path extending in a direction intersecting the axial direction; and
the stopper has an annular shape.

6. The brake device according to claim 2, wherein
the fourth oil path is located further in the first direction than the stopper; and
in a state where the press-fitting of the press-fitting portion into the first oil path is released, the throttle member is moved in the first direction, and the first contact portion and the second contact portion are in contact with each other, the third oil path and the fourth oil path connected through a communication path facing both the stopper and the throttle member or one of the stopper and the throttle member.

* * * * *